(12) United States Patent
Sofy

(10) Patent No.: US 7,007,538 B2
(45) Date of Patent: Mar. 7, 2006

(54) BREAKAWAY TOOLING

(75) Inventor: David A. Sofy, Troy, MI (US)

(73) Assignee: HMS Products Co., Troy, MI (US)

( * ) Notice: Subject to any disclaimer, the term of this patent is extended or adjusted under 35 U.S.C. 154(b) by 0 days.

(21) Appl. No.: 10/874,840

(22) Filed: Jun. 23, 2004

(65) Prior Publication Data

US 2005/0284205 A1 Dec. 29, 2005

(51) Int. Cl.
*B21D 43/05* (2006.01)

(52) U.S. Cl. .............................. 72/405.16; 72/405.13; 72/405.01; 198/621.1; 403/2

(58) Field of Classification Search ............. 72/405.16, 72/405.13, 4, 405.11, 405.09, 405.01; 198/621.1; 403/2; 192/56.1, 150
See application file for complete search history.

(56) References Cited

U.S. PATENT DOCUMENTS

| | | | | |
|---|---|---|---|---|
| 2,058,699 A | * | 10/1936 | Lehman | 72/405.16 |
| 3,165,192 A | * | 1/1965 | Wallis | 198/621.1 |
| 3,267,499 A | * | 8/1966 | Prutton | 470/11 |
| 3,602,065 A | * | 8/1971 | Ratcliff | 74/524 |
| 3,655,070 A | * | 4/1972 | Haydu | 198/621.1 |
| 4,833,908 A | | 5/1989 | Sofy | |
| 4,852,381 A | | 8/1989 | Sofy | |
| 4,895,013 A | | 1/1990 | Sofy | |
| 5,074,141 A | | 12/1991 | Takeuchi | |
| 6,196,044 B1 | | 3/2001 | Sofy | |

* cited by examiner

*Primary Examiner*—Daniel C. Crane
(74) *Attorney, Agent, or Firm*—Howard & Howard

(57) ABSTRACT

A mounting plate (16) pivotally supports a finger (14) for pivotal movement about a pivot axis A as a shear pin (34) breaks between a post (30) and the finger (14) in response to a predetermined force urging the finger (14) to pivot about the pivot axis A. A first fastener (24) is disposed under an opening (46) in the finger (14) for removing the mounting plate (16) and the finger (14) together as a unit from the transfer bar (12) while remaining connected by a bolt (36) at the pivot axis A.

36 Claims, 3 Drawing Sheets

BREAKAWAY TOOLING

BACKGROUND OF THE INVENTION

1. Field of the Invention

The subject invention relates to work piece transfer assembly for a press including a reciprocating member and a series of longitudinally spaced in-line stations wherein each station is a further progression of a work piece forming process and, more specifically, to a mounting system for a finger which engages and moves the work piece.

2. Description of the Prior Art

Such work piece transfer assemblies usually include a transfer bar and a motion transmitting mechanism for moving the bar inward, outward, and longitudinally for transferring work pieces through the press. A finger is attached to the transfer bar for engaging and transferring work pieces through the press. Typical prior art assemblies are disclosed in U.S. Pat. Nos. 4,833,908; 4,852,381; 4,895,013 and 6,196,044 to Sofy, and 5,074,141 to Takeuchi.

It is known to pivotally support the finger on a horseshoe or U-shaped mounting member having its legs attached to the transfer bar with a shear pin interconnecting the mounting member and the finger at the bottom of the U-shape for preventing pivotal movement of the finger during normal operation. The shear pin shears in response to an overload thereby allowing the finger to pivot relative to the mounting member to prevent damage to the transfer system. However, the horseshoe shaped mounting member occupies a significant amount of space between the attachment of the legs to the transfer bar and the displaced bottom rendering it relatively large and expensive. The size of the horseshoe shaped mounting member restricts the closeness of adjacent fingers.

BRIEF SUMMARY OF THE INVENTION AND ADVANTAGES

The subject invention is for use in a work piece transfer assembly for a press including a reciprocating member and a series of longitudinally spaced in-line stations wherein each station is a further progression of a work piece forming process and wherein a finger is adapted for attachment to a transfer bar and extends in a cantilevered fashion to a distal end for engaging and transferring work pieces through the press. A mounting plate pivotally supports the finger for pivotal movement about a pivot axis and first and second fasteners connect the mounting plate to the transfer bar. A first end of a shear pin is disposed in the mounting plate and a second end is disposed in the finger for shearing in response to a predetermined force urging the finger to pivot about the pivot axis. The assembly is characterized by the first fastener being disposed under the finger for removing the mounting plate and the finger together from the transfer bar while remaining connected at the pivot axis.

By overlapping the finger with the mounting plate attachment to the transfer bar, the assembly is more compact, less expensive and allows more flexibility in the spacing between adjacent fingers.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
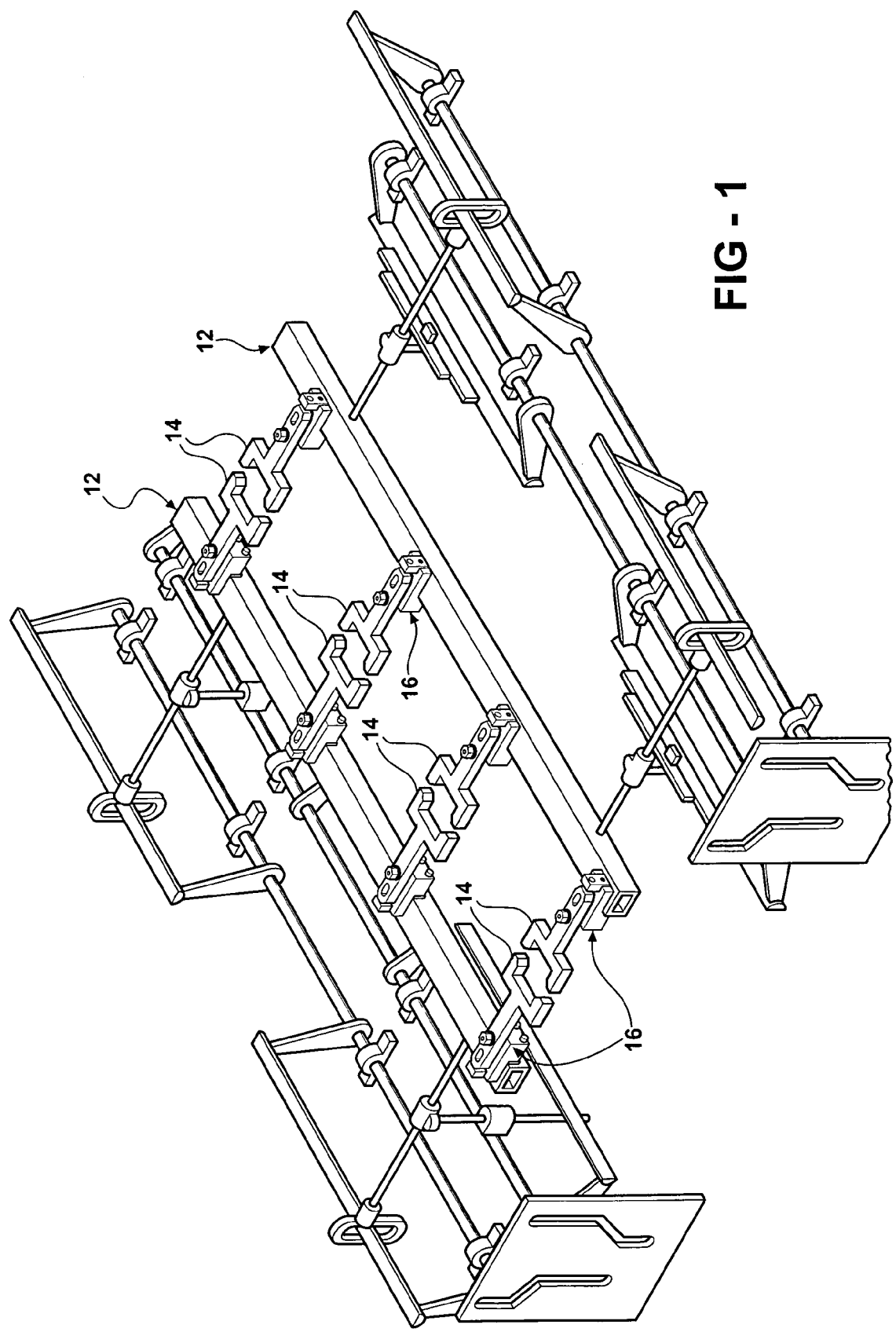
FIG. 1 is a perspective view of a transfer mechanism including the subject invention.
Figure 2:
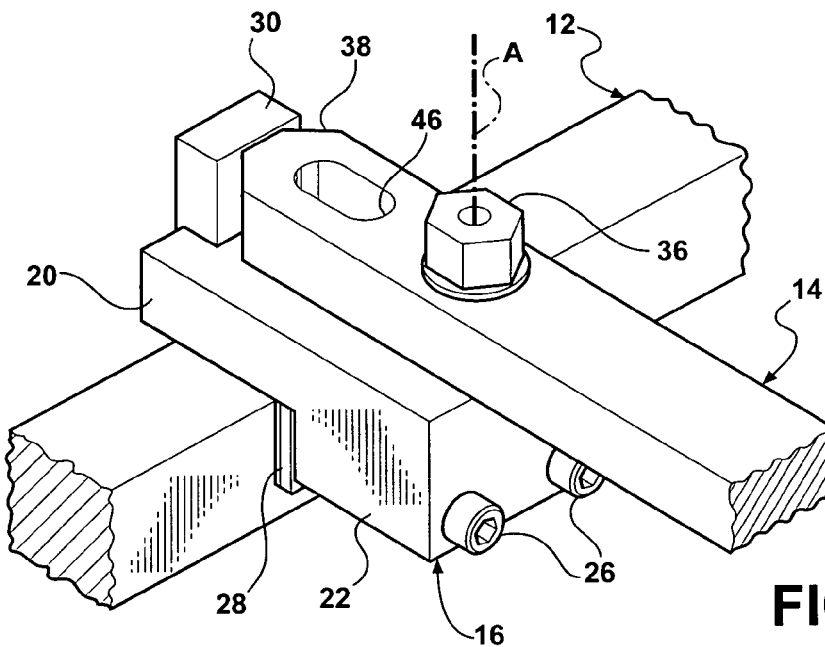
FIG. 2 is a perspective view from the top of the finger and mounting plate of the subject invention.

Referring to the Figures, wherein like numerals indicate like or corresponding parts throughout the several views, a work piece transfer assembly for a press including a reciprocating member and a series of longitudinally spaced in-line stations wherein each station is a further progression of a work piece forming process is shown in FIG. 1. The transfer assembly is specifically adapted for operation with a press of the type including a reciprocating member, i.e., a ram, and a series of in-line die stations wherein each station is a further progression of the work piece forming process. A plurality of work pieces are shown in phantom in FIG. 1.

The transfer assembly includes a transfer bar, generally indicated at 12, and a motion transmitting mechanism for moving the transfer bar 12 inward, outward, and longitudinally for transferring work pieces through the press. The transfer mechanism may be of the type well known in the art as described in any one of the aforementioned Sofy patents. A finger 14 is attached to the transfer bar 12 for engaging and transferring work pieces through the press.

A mounting plate, generally indicated at 16, pivotally supports each of the fingers 14 for pivotal movement about a pivot axis A extending transversely to the transfer bar 12 with each finger 14 extending in a cantilevered fashion to a distal end for engaging the work pieces, the distal end being forked to engage a work piece. Each finger 14 includes a shank 18 that has a four-sided cross section.

Figure 3:
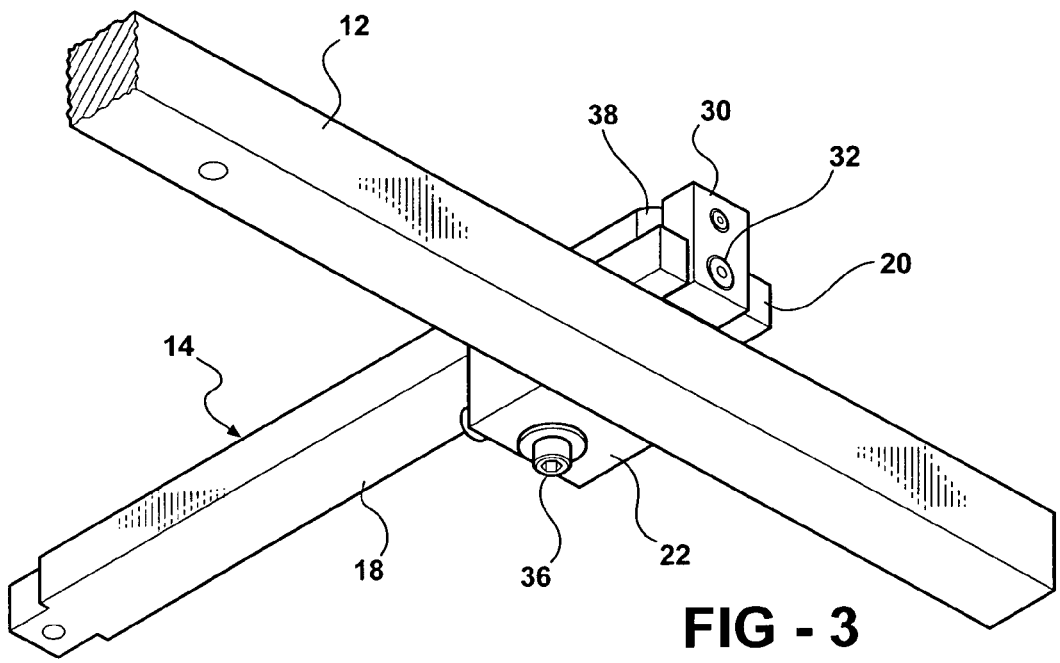
FIG. 3 is a perspective view from the bottom of the finger and mounting plate of the subject invention.
Figure 5:
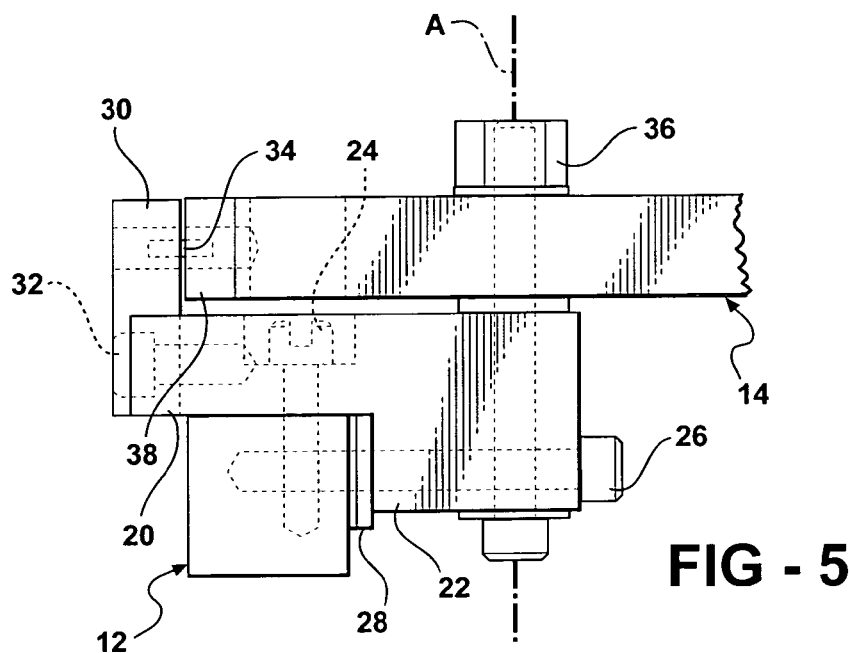
FIG. 5 is a side view of the finger and mounting plate of the subject invention.
Figure 6:
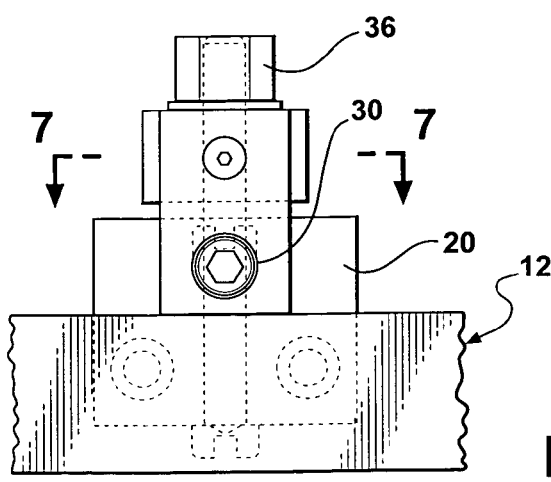
FIG. 6 is a end view of the finger and mounting plate of the subject invention.

The transfer bar 12 includes a top, bottom and inner and outer sides. The mounting plate 16 includes a top portion 20 extending over the top of the transfer bar 12 and a side portion 22 extending downwardly from the top portion 20 along the outer side of the transfer bar 12. In other words, the mounting plate 16 L-shaped as viewed in a side view, e.g., FIG. 3 or 5. A first fastener or bolt 24 extends through the top portion of the mounting plate 16 and threadedly connects to the transfer bar 12. A pair of second fasteners 26 extend through the side portion 22 of the mounting plate 16 and into threaded connection to the transfer bar 12. The second fasteners 26 are disposed perpendicular to the first fastener 24 with the first fastener 24 disposed in a plane extending parallel to and between the pair of second fasteners 26. A shim or spacing element 28 is disposed between the side portion 22 and the outer side of the transfer bar 12.

A post 30 is independent of said mounting plate 16 and a post fastener 32 interconnects the post 30 and the mounting plate 16. The post 30 extends upwardly from the top portion 20 of the mounting plate 16 and supports a first end of a shear pin 34 on the mounting plate 16.

Figure 7:
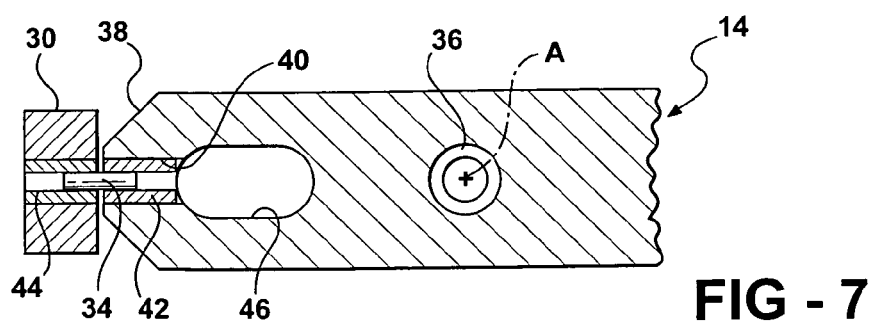
FIG. 7 is a cross sectional view of the inner end of the finger and shear pin of the subject invention.
Figure 4:
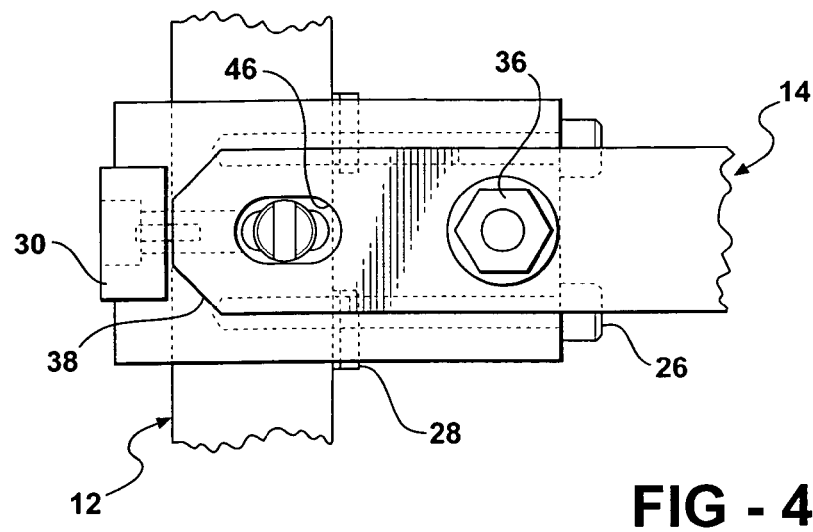
FIG. 4 is a top view of the finger and mounting plate of the subject invention.

The pivot axis A extends perpendicular to the top portion 20 and through the side portion 22 of the mounting plate 16 and is defined by a pivot pin or bolt 36 on the pivot axis A pivotally connecting the finger 14 to the side portion 22 of the mounting plate 16. The finger 14 extends inwardly from the pivot axis A to an inner end 38 spaced from and adjacent the post 30. The second end of the shear pin 34 is disposed in the inner end 38 of the finger 14. More specifically and as shown in FIG. 7, the finger 14 presents a shear pin hole 40 extending into the inner end 38 and a finger bushing 42 is press fit into the pin hole 40 in the finger 14 and surrounds the second end of the shear pin 34.

A post bushing 44 is press fit into the post 30 and surrounds the first end of the shear pin 34. In the preferred embodiment, the shear pin 34 is press fit into the respective bushings 42 and 44. In other words, each of the bushings 42, 44 are held in place by a press fit and the shear pin 34 is held in each of the bushings 42, 44 by a press fit. The shear pin 34 shears or breaks at its midpoint between the post 30 and the finger 14 in response to a predetermined force urging the finger 14 to pivot about the pivot axis A. The shear pin 34 is brittle from end to end and radially from the center thereof by being hardened. Normally, the center of the shear pin 34 is soft as only the exterior skin is hardened. However, the instant shear pin 34 is heat treated so as be hardened and brittle completely throughout, i.e., no soft center.

In order to provide sufficient clearance between the inner end 38 of the finger 14 and the post 30 to allow the finger 14 to pivot upon shearing of the shear pin 34, the finger 14 presents a relief or bevel on either side of the pin hole 40. Alternatively, the end of the finger 14 may be rounded or otherwise relieved to provide the clearance.

The first fastener 24 is disposed under the finger 14 for removing the mounting plate 16 and the finger 14 together as a unit from the transfer bar 12 while connected by the bolt 36 at the pivot axis A. To accommodate such removal with or without shearing the shear pin 34, the finger 14 has an opening 46 therethrough for access to the first fastener 24, i.e., the first fastener 24 extends through the top portion 20 and into the transfer bar 12 under the opening 46. The top portion 20 of the mounting plate 16 is counter-bored to receive the head of the first fastener 24 whereby the first fastener 26 is below the top surface of the mounting plate 16 to allow clearance for the pivotal movement of the finger 14 about the axis A upon shearing of the shear pin 34.

The shear pin hole 40 extends from the inner end 38 of the finger 14 completely to the opening 46 to allow access to the finger bushing 42 and the shear pin 34 from the opening 46. In other words, the finger bushing 42 may be removed and inserted through the opening 46.

The mounting of the shear pin 34 combination to the transfer bar 14 is very compact as the pivotal axis A of the finger 14 is disposed on one side of the transfer bar 14 and the shear pin 34 is disposed on the other side of the transfer bar 14. The inner end 38 of the finger 14 extends over the transfer bar 14 and the attachment of the mounting plate 16 to the transfer bar 14 while allowing the mounting plate 16 and finger 14 to be removed from the transfer bar 14 as a unit, i.e., connected at the pivot axis A. This combination provides compactness and allows the fingers 14 to be mounted very close to one another on the transfer bar 14.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. In addition, the reference numerals in the claims are merely for convenience and are not to be read in any way as limiting.

What is claimed is:

1. A work piece transfer assembly for a press including a reciprocating member and a series of longitudinally spaced in-line stations wherein each station is a further progression of a work piece forming process, said assembly comprising:
   a transfer bar (12);
   a motion transmitting mechanism for moving said bar (12) inward, outward, and longitudinally for transferring work pieces through the press;
   a finger (14) for engaging and transferring work pieces through the press;
   a mounting plate (16) pivotally supporting said finger (14) for pivotal movement about a pivot axis (A) extending transversely to said transfer bar (12) with said finger (14) extending in a cantilevered fashion to a distal end for engaging the work pieces;
   first (24) and second (26) fasteners connecting said mounting plate (16) to said transfer bar (12); and
   a shear pin (34) having a first end supported by said mounting plate (16) and a second end disposed in said finger (14) for shearing in response to a predetermined force urging said finger (14) to pivot about said pivot axis (A);
   said assembly characterized by said first fastener (24) disposed under said finger (14) for removing said mounting plate (16) and said finger (14) together from said transfer bar (12) while connected at said pivot axis (A).

2. An assembly as set forth in claim 1 wherein said finger (14) has an opening (46) therethrough for access to said first fastener (24).

3. An assembly as set forth in claim 2 wherein said transfer bar (12) includes a top, bottom and inner and outer sides, said mounting plate (16) includes a top portion (20) extending over said top of said transfer bar (12) and a side portion (22) extending from said top portion (20) along said outer side of said transfer bar (12).

4. An assembly as set forth in claim 3 wherein said first fastener (24) extends through said top portion (20) and into said transfer bar (12) under said opening (46).

5. An assembly as set forth in claim 4 wherein said second fastener (26) extends through said side portion (22) and into said transfer bar (12).

6. An assembly as set forth in claim 5 wherein said pivot axis (A) extends perpendicular to said top portion (20) and through said side portion (22) of said mounting plate (16).

7. An assembly as set forth in claim 6 wherein said mounting plate (16) includes a post (30) extending upwardly from said top portion (20) of said mounting plate (16), said finger (14) having an inner end (38) adjacent said post (30), said first end of said shear pin (34) disposed in said post (30) and said second end disposed in said inner end (38) of said finger (14).

8. An assembly as set forth in claim 7 wherein said finger (14) presents a shear pin hole (40) extending from said inner end (38) to said opening (46).

9. An assembly as set forth in claim 8 including a post bushing (44) in said post (30) and surrounding said first end of said shear pin (34) and a finger bushing (42) in said pin hole in said finger (14) and surrounding said second end of said shear pin (34).

10. An assembly as set forth in claim 9 wherein each of said bushings are held in place by a press fit and said shear pin (34) is held in each of said bushings by a press fit.

11. An assembly as set forth in claim 10 wherein said shear pin (34) is brittle from end to end and radially from the center thereof by being hardened.

12. An assembly as set forth in claim 10 wherein said post (30) is independent of said mounting plate (16) and including a post fastener (32) interconnecting said post (30) and said mounting plate (16).

13. An assembly as set forth in claim 12 including a pivot pin (36) on said pivot axis A pivotally connecting said finger (14) to said side portion (22) of said mounting plate (16).

14. An assembly as set forth in claim 12 including a pair of said second fasteners (26) disposed perpendicular to said first fastener (24) with said first fastener (24) disposed in a plane extending parallel to and between said pair of second fasteners (26).

15. An assembly as set forth in claim 12 wherein said inner end (38) of said finger (14) presents a relief on either side of said pin hole for providing sufficient clearance between said inner end (38) and said post (30) to allow said finger (14) to pivot upon shearing of said shear pin (34).

16. An assembly as set forth in claim 1 wherein transfer bar (12) includes a top, bottom and inner and outer sides, said mounting plate (16) includes a top portion (20) extending over said top of said transfer bar (12) and a side portion (22) extending from said top portion (20) along said outer side of said transfer bar (12), said first fastener (24) extends through said top portion (20) and into said transfer bar (12), said second fastener (26) extends through said side portion (22) and into said transfer bar (12).

17. An assembly as set forth in claim 16 including a pair of said second fasteners (26) disposed perpendicular to said first fastener (24) with said first fastener (24) disposed in a plane extending parallel to and between said pair of second fasteners (26).

18. An assembly as set forth in claim 17 wherein said finger (14) has an opening (46) therethrough for access to said first fastener (24).

19. An assembly as set forth in claim 2 wherein said finger (14) presents a shear pin hole (40) extending from said inner end (38) to said opening (46).

20. An assembly as set forth in claim 19 including a finger bushing (42) in said pin hole in said finger (14) and surrounding said second end of said shear pin (34).

21. An assembly as set forth in claim 20 wherein said bushing is held in place by a press fit and said shear pin (34) is held in said bushing by a press fit.

22. An assembly as set forth in claim 1 wherein said shear pin (34) is brittle from end to end and radially from the center thereof by being hardened.

23. A work piece transfer assembly for a press including a reciprocating member and a series of longitudinally spaced in-line stations wherein each station is a further progression of a work piece forming process, said assembly comprising:
   a finger (14) adapted for attachment to a transfer bar (12) for engaging and transferring work pieces through a press;
   a mounting plate (16) pivotally supporting said finger (14) for pivotal movement about a pivot axis A extending transversely to the transfer bar (12) with said finger (14) extending in a cantilevered fashion to a distal end for engaging the work pieces;
   first (24) and second (26) fasteners for connecting said mounting plate (16) to the transfer bar (12); and
   a shear pin (34) having a first end supported by said mounting plate (16) and a second end disposed in said finger (14) for shearing in response to a predetermined force urging said finger (14) to pivot about said pivot axis A;
   said assembly characterized by said first fastener (24) disposed under said finger (14) for removing said mounting plate (16) and said finger (14) together from the transfer bar (12) while remaining connected at said pivot axis A.

24. An assembly as set forth in claim 23 wherein said finger (14) has an opening (46) therethrough for access to said first fastener (24).

25. An assembly as set forth in claim 24 wherein said mounting plate (16) includes a top portion (20) for extending over the transfer bar (12) and a side portion (22) extending from said top portion (20) for extending along the outer side of the transfer bar (12).

26. An assembly as set forth in claim 25 wherein said first fastener (24) extends through said top portion (20) for engaging the transfer bar (12) under said opening (46).

27. An assembly as set forth in claim 26 wherein said second fastener (26) extends through said side portion (22) for engaging the side of the transfer bar (12).

28. An assembly as set forth in claim 27 wherein said pivot axis A extends perpendicular to said top portion (20) and through said side portion (22) of said mounting plate (16).

29. An assembly as set forth in claim 28 wherein said mounting plate (16) includes a post (30) extending upwardly from said top portion (20) of said mounting plate (16), said finger (14) having an inner end (38) adjacent said post (30), said first end of said shear pin (34) disposed in said post (30) and said second end disposed in said inner end (38) of said finger (14).

30. An assembly as set forth in claim 29 wherein said finger (14) presents a shear pin hole (40) extending from said inner end (38) to said opening (46).

31. An assembly as set forth in claim 30 including a post bushing (44) in said post (30) and surrounding said first end of said shear pin (34) and a finger bushing (42) in said pin hole in said finger (14) and surrounding said second end of said shear pin (34).

32. An assembly as set forth in claim 31 wherein each of said bushings are held in place by a press fit and said shear pin (34) is held in each of said bushings by a press fit.

33. An assembly as set forth in claim 32 wherein said shear pin (34) is brittle from end to end and radially from the center thereof by being hardened.

34. An assembly as set forth in claim 32 wherein said post (30) is independent of said mounting plate (16) and including a post fastener (32) interconnecting said post (30) and said mounting plate (16).

35. An assembly as set forth in claim 34 including a pivot pin (36) on said pivot axis A pivotally connecting said finger (14) to said side portion (22) of said mounting plate (16).

36. An assembly as set forth in claim 34 including a pair of said second fasteners (26) disposed perpendicular to said first fastener (24) with said first fastener (24) disposed in plane extending parallel to and between said pair of second fasteners (26).

* * * * *